United States Patent
Arneja

(10) Patent No.: US 12,015,534 B2
(45) Date of Patent: Jun. 18, 2024

(54) METHOD AND SYSTEM FOR CONGESTION DETECTION AND VALIDATION IN A NETWORK

(71) Applicant: Arista Networks, Inc., Santa Clara, CA (US)

(72) Inventor: Gagandeep S. Arneja, San Francisco, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 62 days.

(21) Appl. No.: 17/156,194

(22) Filed: Jan. 22, 2021

(65) Prior Publication Data

US 2022/0239575 A1    Jul. 28, 2022

(51) Int. Cl.
*H04L 43/0817*   (2022.01)
*H04L 41/0604*   (2022.01)
*H04L 43/0852*   (2022.01)
*H04L 43/0876*   (2022.01)
*H04L 47/11*     (2022.01)
*H04L 47/12*     (2022.01)

(52) U.S. Cl.
CPC ...... *H04L 43/0817* (2013.01); *H04L 41/0627* (2013.01); *H04L 43/0852* (2013.01); *H04L 43/0876* (2013.01); *H04L 47/11* (2013.01); *H04L 47/12* (2013.01)

(58) Field of Classification Search
CPC ............ H04L 43/0817; H04L 43/0852; H04L 43/0876; H04L 41/0627; H04L 47/11; H04L 47/12
See application file for complete search history.

(56) References Cited

U.S. PATENT DOCUMENTS

| 2011/0267952 A1* | 11/2011 | Ko ............... H04L 43/0864 370/237 |
| 2014/0269378 A1* | 9/2014 | Holbrook ........ G11C 11/4076 370/252 |
| 2019/0052565 A1* | 2/2019 | Modi ............. H04L 47/283 |
| 2022/0038374 A1* | 2/2022 | Koral ............. H04L 47/11 |

OTHER PUBLICATIONS

Feng et al. "A New Framework for Network Flow Queuing Delay Prediction Based on Stream Computing", https://ieeexplore.ieee.org/stamp/stamp.jsp?tp=&arnumber=8818985 (Year: 2019).*
Kumar et al. "Inband Flow Analyzer", https://datatracker.ietf.org/doc/html/draft-kumar-ippm-ifa-02/ (Year: 2020).*

(Continued)

*Primary Examiner* — Aftab N. Khan
*Assistant Examiner* — Patrick F Ngankam
(74) *Attorney, Agent, or Firm* — SPRINKLE IP LAW GROUP

(57) ABSTRACT

A method for managing a network by a network monitoring system, wherein the network comprises a plurality of network devices, the method comprising receiving, by the network monitoring system, in-band network telemetry (INT) data from a network device of the plurality of network devices, updating a latency model of the network using the INT data to obtain an updated latency model, identifying a congestion point in the network using the updated latency model and at least a portion of the INT data, validating the congestion point; and initiating a remediation action based on the validation.

18 Claims, 8 Drawing Sheets

(56) References Cited

OTHER PUBLICATIONS

Kumar et al. "Inband Flow Analyzer", file:///C:/Users/pngankam/Downloads/draft-kumar-ippm-ifa-07%20(1).pdf (Year: 2020).*
Arista Networks "Arista Networks' Latency Analyzer", https://www.arista.com/assets/data/pdf/Whitepapers/Arista_LANZ_Overview_TechBulletin_0213.pdf (Year: 2016).*
Feng et al. "A New Framework for Network Flow Queuing Delay—prediction based on stream computing", (Year: 2020).*
Kumar et al. "Inband Flow Analyzer" (Year: 2019).*
Arista Networks "Arista Network's Latency Analyzer" (Year: 2016).*
Traffic Monitoring using sFlow, Making the Network Visible, www.sFlow.org, 2003, 5 pages.
J. Kumar et al., Traffic Monitoring using sFlow draft-kumar-ippm-ifa-02, Network Working Group, Apr. 24, 2020, 35 pages.
Arista LANZ Overview, Arista Networks' Latency Analyzer, Arista Networks, Inc., 2016, 6 pages.
Feng Yixiao et al "A SmartNIC-Accelerated Monitoring Platform for In-band Network Telemetry" 2020 IEEE International Symposium on Local and Metropolitan Area Networks (LANMAN, IEEE, Jul. 13, 2020 (Jul. 13, 2020), pp. 1-6, [retrieved on Jul. 30, 2020] (6 pages).
Feng Yu et al: "A New Framework for Network Flow Queuing Delay Prediction Based on Stream Computing", 2019 IEEE 5th Intl Conference on Big Data Security on Cloud (Bigdatasecurity), IEEE Intl Conference on High Performance and Smart Computing, (HPSC) and IEEE Intl Conference on Intelligent Data and Security (IDS), IEEE, May 27, 2019 (May 27, 2019), pp. 212-217 (6 pages).
International Search Report and Written Opinion dated Apr. 22, 2022 for corresponding PCT Application No. PCTUS2022012861 filed Jan. 19, 2022 (15 pages).
Karaagac J Hoebeke Ghent University-IMEC A: "In-band Network Telemetry for 6TiSCH Networks; draft-karaagac-6tisch-int-01 . txt", Jul. 13, 2020 (Jul. 13, 2020), pp. 1-15, Retrieved from the Internet: URL:https://tools.ietf.org/html/draft-karaagac-6tisch-int-01 [retrieved on Jul. 13, 2020] (15 pages).
Pan et al "In-band Network-Wide Telemetry; draft-tian-bupt-inwt-mechanism-policy-01 . txt", Oct. 25, 2020 (Oct. 25, 2020), pp. 1-15, Retrieved from the Internet: URL:https://tools,ietf.org/html/draft-tian-bupt-inwt-mechanism-policy-01 [retrieved on Oct. 25, 2020] (15 pages).
International Preliminary Report on Patentability issued for International Application No. PCT/US2022/12861, dated Aug. 3, 2023, 13 pages.

* cited by examiner

METHOD AND SYSTEM FOR CONGESTION DETECTION AND VALIDATION IN A NETWORK

BACKGROUND

Networks have become increasingly complex. This increased complexity is due to the increase in the number of hosts that are connecting to (and/or communicating over) the network as well as the number (and interconnections) of network devices (e.g., switches) within the network. In order to ensure that these complex networks are operating efficiently, and/or as expected, network administrators attempt to obtain information about how the network is operating. Traditionally, information obtained by the network administrators provides an incomplete picture of how the network is actually operating. As a result, network administrators are not able to efficiently optimize the network and/or readily detect when there are actual issues with the operation of the network.

DETAILED DESCRIPTION

Figure 1A:
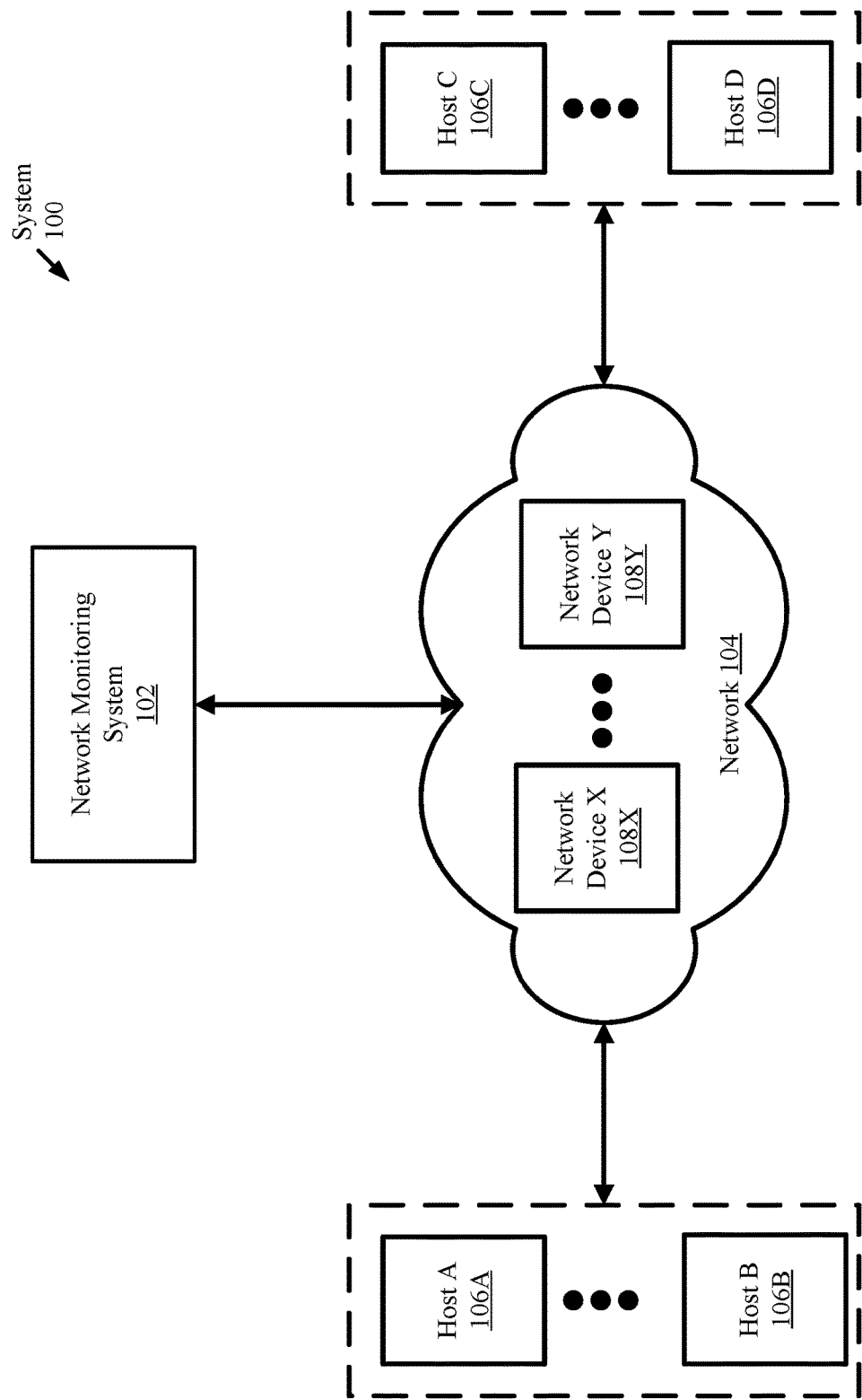
FIG. 1A shows a system in accordance with one or more embodiments of the disclosure.

As discussed above, networks have become increasingly complex. Network administrators may attempt to determine how networks are operating using various monitoring technologies. These monitoring technologies include queue depth monitoring technology (QDMT), sampling technology (ST), and in-band network telemetry technology (INTT).

The QDMT is implemented on a per-network device basis and monitors the number of packets that are present in egress queues on network devices. If the number of packets in a given egress queue exceeds a certain threshold (which, e.g., is defined by the network administrator), then a queue depth report is sent to a network monitoring system (e.g., a network controller). The QDMT indicates the depth of a given egress queue on a network device; however, the QDMT is unable to provide information on the cause of the congestion in the egress queue and/or to which flows in the egress queue the packets are associated.

The ST (e.g., sFlow) is implemented on a per-network device basis and involves randomly sampling packets that are received by a network device. The copies of the randomly sampled packets (along with other data plane and/or control plane information) are then periodically provided to the network monitoring system. The network monitoring system analyzes the copies of the randomly sampled packets to develop a "view" of the flows that are being processed by the network devices.

The INTT involves tracking a packet(s) as it traverses through the network. More specifically, INTT involves tagging a packet at an INT source (e.g., a given network device in the network). Once tagged, latency measurements are appended to (or otherwise associated with) the packet each time it encounters a network device as it traverses through the network. The latency measurements may include a timestamp of when the packet was received by the network device and/or a timestamp of when the packet was transmitted from the network device. When the tagged packet is received by an INT sink (e.g., another network device in the network), the timestamps along with a copy of the tagged packet is sent to the network monitoring system. The timestamps are then used to determine the processing latency of each network device (e.g., how long the packet was stored in an egress queue on the network device) that the tagged packet encountered.

Each of these monitoring technologies individually provides certain information about the operation of the network but none of these technologies alone have the ability to provide a complete understanding of egress queues that are actually congested and what flows are impacted by the congestion of the aforementioned egress queues.

In one embodiment of the disclosure, the latency measurements (which are derived from the timestamps in the INT data) are used to develop a latency model of the network. Specifically, the network monitoring system maintains a Quality of Service (QoS) to egress queue mapping. The QoS mapping identifies which packets are associated with each of the egress queues. When a given latency measurement is received, the header of the copy of the tagged packet that is associated with the latency measurements is analyzed to determine with which egress queue the latency measurement should be associated. More specifically, the header is analyzed to determine the associated QoS information for the tagged packet. The QoS to egress queue mapping along with the determined QoS information is then used to identify in which egress queue that tagged packet was placed. The latency measurement is then associated with the identified egress queue. Associating the latency measurement with the identified egress queue involves updating a latency value (which is, e.g., a weighted moving average of the latency measurements of the egress queue) using the most recently determined latency measurement. The aforementioned process is repeated, as appropriate, on egress queues throughout the network. The result is a latency model that reflects the average latency of egress queues on the network devices in the network.

In addition to using the latency measurements to determine the latency values, the latency measurement(s) is compared to the corresponding latency value in the latency model to determine whether a latency measurement has deviated from the latency value outside an expected range. If this occurs, then the network monitoring system checks to see if it has received any information from the QDMT for the egress queue on which the latency measurement has deviated from the latency value outside an expected range. The network monitoring system performs a check across a validation window. The validation window is a period of time that includes: (i) the time during which the timestamps were received by the network monitoring system, (ii) the time during which the latency measurements were calculated based on the timestamps, and (iii) the time during which an egress queue was initially identified as being congested (see e.g., FIG. 3). For example, if the timestamps were received at time T then the validation window may be, e.g.: (i) T±x seconds and/or (ii) T to T+y seconds. The validation window is used as the information (in the form of queue depth reports) received from the QDMT may not be received at exactly the same time as the time that the timestamps were received and/or the latency measurements were calculated; nonetheless, such information from the QDMT may be associated with the egress queue that triggered the review of information from QDMT that was received during the validation window.

If information is received from the QDMT during the validation window and such information specifies the egress queue that triggered the review of information from QDMT that was received during the validation window, then the network monitoring system determines that there was in-fact congestion in the egress queue. Alternatively, if there is no associated information from the QDMT, then the monitoring system may either: (i) take no further action or (ii) proceed as-if there is congestion in the aforementioned egress queue.

When the network monitoring system determines that there is in-fact congestion or proceeds as-if there is congestion, then the networking monitoring system may use the information from the ST to identify the flows that are using the egress queue (e.g., =the egress queue at which the latency measurement has deviated from the latency value outside an expected range). The network monitoring system may then issue a notification to a network administrator, where the notification identifies the egress queue(s) that experienced (or is experiencing) congestion as well as the flows that use the aforementioned egress queues. Additionally, or alternatively, the network monitoring system may initiate reconfiguration of one or more network devices to modify the path that one or more of the impacted flows takes through the network. In this manner, the network monitoring system may reduce current congestion and/or mitigate future congestion.

Thus, one or more embodiments of the disclosure utilizes various network monitoring technologies to accurately identify potential congestion (e.g., using INTT), validates that there is actually congestion (e.g., using QDMT), and then provides insight (e.g., using ST) into what flows are causing, and/or are impacted by, the congestion. With this information, the network monitoring system and/or the network administrators can take steps to mitigate and/or reduce congestion in the network.

Various embodiments are described below.

FIG. 1A shows a system in accordance with one or more embodiments of the disclosure. The system (100) includes one or more host(s) (106A, 106B, 106C, 106D) operatively connected to each other via a network (104). The network includes one or more network device(s) (108X, 108Y) and is monitored by a network monitoring system (102), which is operatively connected to one or more network devices (106A, 106B, 106C, 106D). Each of these components is described below.

In one embodiment of the disclosure, the network monitoring system (102) may be one or more computing devices that manage a set of network devices (e.g., 108X, 108Y). In one embodiment of the disclosure, each computing device is any physical or virtual device that may be used for performing various embodiments of the disclosure. The physical device may correspond to any physical system (see e.g., FIG. 5) with functionality to implement one or more embodiments of the disclosure. For example, the physical device may be a server (i.e., a device with at least one or more processor(s), memory, and an operating system) that is directly (or operatively, e.g., via the network) connected to at least one host (e.g., 106A, 106B, 106C, 106D) and at least one network device (e.g., 108X, 108Y).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the network monitoring system (102) may be implemented using one or more virtual machines. Broadly speaking, virtual machines are distinct operating environments configured to inherit underlying functionality of the host operating system (and access to the underlying host hardware) via an abstraction layer. In one or more embodiments of the disclosure, a virtual machine includes a separate instance of an operating system, which is distinct from the host operating system. For example, one or more embodiments of the disclosure may be implemented on VMware® architecture involving: (i) one or more virtual machines executing on a host computer system such that each virtual machine serves as a host to an instance of a guest operating system; and (ii) a hypervisor layer serving to facilitate intra-host communication between the one or more virtual machines and the host computer system hardware. Alternatively, one or more embodiments of the disclosure may be implemented on Xen® architectures involving: (i) a control host operating system (e.g., Dom 0) including a hypervisor; and (ii) one or more virtual machines (e.g., Dom U) executing guest operating system instances. VMware® is a registered trademark of VMware, Inc. Xen® is a trademark overseen by the Xen Project Advisory Board. In another embodiment of the disclosure, the network monitoring system (102) may be implemented using one or more containers. A container is an isolated execution environment that executes on an operating system. Unlike virtual machines, which each execute on their own isolated operating system, containers executing on a single computing device share the same underlying operating system.

In one embodiment of the disclosure, the network monitoring system (102) may be implemented using one or more virtual instances (e.g., one or more virtual machines or one or more containers) executing on a network device. In another embodiment of the disclosure, the network monitoring system may be implemented in one or more virtual machines or containers executing on a server that is operatively (via the network) (or directly) connected to one or more host(s) (e.g., 106A, 106B, 106C, 106D in FIG. 1A) and/or one or more network device(s).

In one embodiment of the disclosure, the network monitoring system (102) includes executable instructions (stored in a non-transitory computer readable medium (not shown)), which when executed by a processor(s) in the network monitoring system, enables the network monitoring system (102) to perform the methods described below (see e.g., FIGS. 2A-3). Additional detail about the network monitoring system (102) is described below with respect to FIG. 1C.

In one embodiment of the disclosure, the one or more host(s) (106A, 106B, 106C, 106D) may each be a computing device (see e.g., FIG. 5) or virtual instance (discussed above) that is configured to interact with the network (104). In one embodiment of the disclosure, a host includes functionality to send packets to the network and receive packets from the network. The packets sent to the network may be destined for other hosts operatively connected to the network, destined for the network monitoring system, and/or destined for a specific network device in the network. The packets received from the network may have originated from other hosts operatively connected to the network, originated from the network monitoring system, and/or originated from a specific network device in the network.

In one embodiment of the disclosure, the one or more network device(s) (108X, 108Y) are physical devices that include persistent storage, memory (e.g., random access memory), one or more processor(s) (including a switch chip), and two or more physical ports. In one embodiment of the disclosure, the switch chip is hardware that determines which egress port on a network device to forward media access control (MAC) frames. The switch chip may include egress and ingress ports that may connect to ports on the network device. Each port may or may not be connected to another device on a network device on the network (104) (e.g., a server, a switch, a router, etc.). The network device may be configured to receive packets via the ports and determine whether to: (i) drop the packet; (ii) process the packet in accordance with one or more embodiments of the disclosure; and/or (iii) send the packet, based on the processing, out another port on the network device.

How the network device makes the determination about whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

Figure 2A:
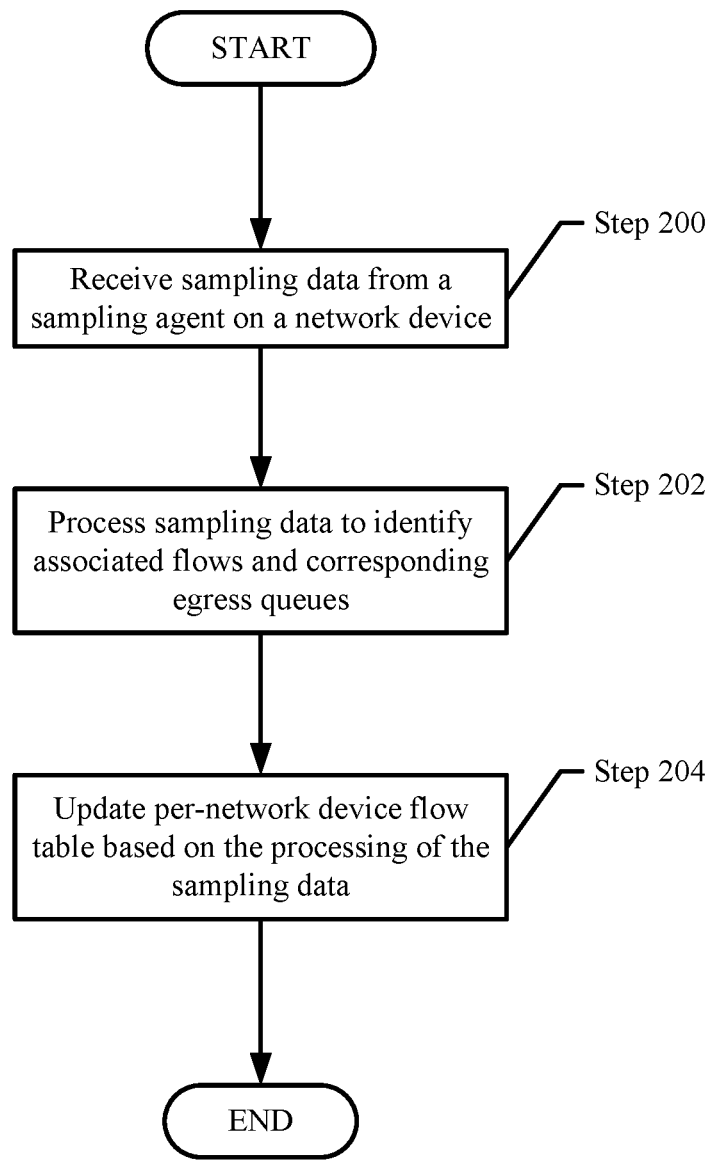
FIG. 2A shows a method for obtaining and processing sampling data by the network monitoring system in accordance with one or more embodiments of the disclosure.
Figure 2B:
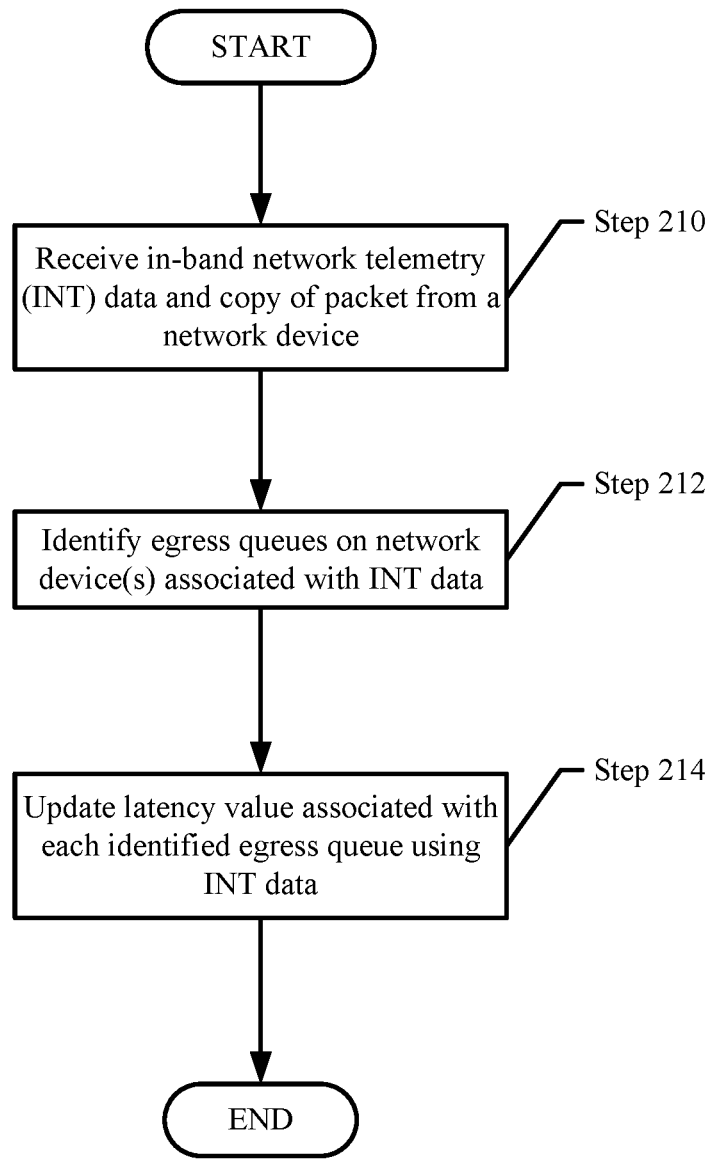
FIG. 2B shows a method for obtaining and processing INT data by the network monitoring system in accordance with one or more embodiments of the disclosure.

In one embodiment of the disclosure, the persistent storage in the network device may include any type of non-transitory computer readable medium that includes instructions, which, when executed by one or more processor(s) in the network device, enable the network device to perform functions described in accordance with one or more embodiments of the disclosure (see e.g., FIGS. 2A-2B).

Examples of network devices include, but are not limited to, a router, a switch, and a multilayer switch. The network device is not limited to the aforementioned specific examples. Additional detail about a network device is described below with respect to FIG. 1B.

In one embodiment of the disclosure, the network (104) may be the medium through which the network monitoring system (102), the one or more host(s) (106A, 106B, 106C, 106D), and the one or more network device(s) (108X, 108Y) are operatively connected. In one embodiment of the disclosure, the network (in addition to the illustrated network devices) may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

The disclosure is not limited to the system shown in FIG. 1A. More specifically, while the system shown in FIG. 1A includes a single network monitoring system, embodiments of the disclosure may be implemented using multiple network monitoring systems, where the multiple network monitoring systems are configured such that if one of the multiple network monitoring systems fails, the other network monitoring systems may continue to operate and provide the functionality described below (see e.g., FIGS. 2A-3).

Figure 1B:
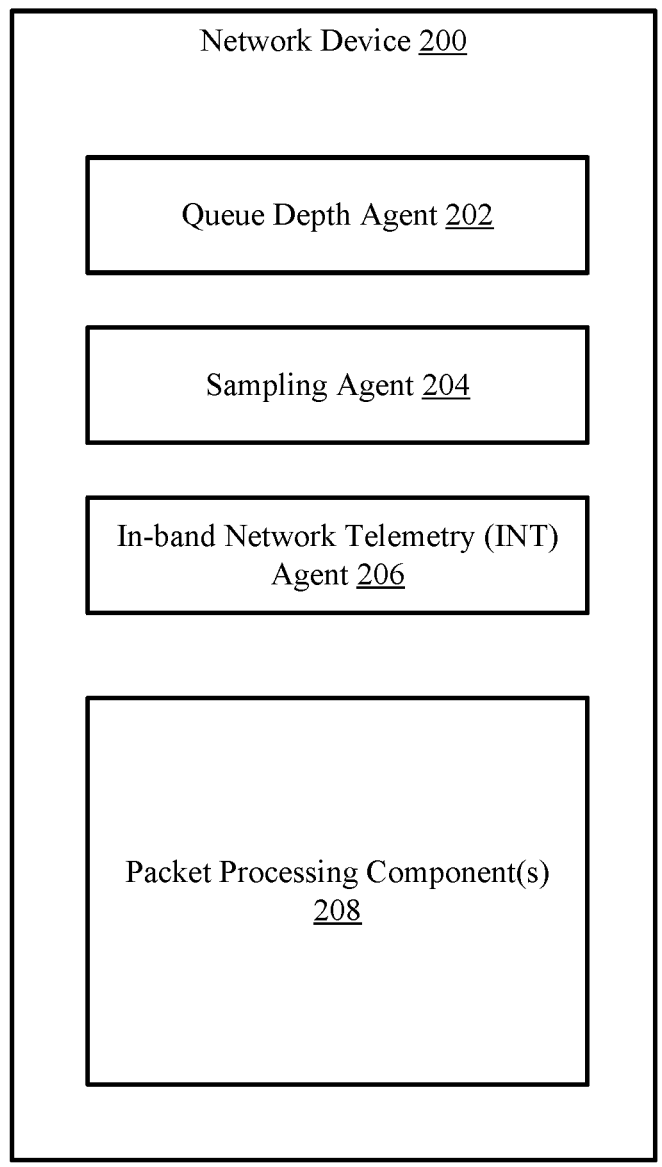
FIG. 1B shows a network device in accordance with one or more embodiments of the disclosure.

FIG. 1B shows a network device in accordance with one or more embodiments of the disclosure. The network device (200) may be an embodiment of a network device (108X, 108Y) discussed below. The network device (200) includes one or more network device agents, e.g., a queue depth agent (202), a sampling agent (204), and an in-band network telemetry agent (206). In addition, the network device includes one or more packet processing components (208). Each of these components is described below.

In one embodiment of the disclosure, the one or more packet processing components (208) include the various hardware components (including, but not limited to, a combination of circuits and storage (which may be persistent or volatile)) that enable the network device to send and receive packets and to monitor the operation of the network device in order to provide the aforementioned network device agents with information related to the operation of the network device. These hardware components include, but are not limited to, ports (or hardware ports) to receive packets and/or transmit packets, one or more ingress queues (which may be implemented using buffers) to temporarily store the received packets, a classifier to determine in which egress queue to place a packet and to tag the packet accordingly (e.g., with QoS information), and one or more egress queues (which may be implemented using buffers) to temporarily store packets prior to the packets being transmitted towards their intended destination using a switch chip (discussed above) via the one or more ports on the network device. The packet processing components may temporarily and/or persistently store one or more data structures to enable the network device to perform the aforementioned functionality. While the packet processing components are described as hardware components, one or more of the packet processing components may be implemented using computer executable instructions.

The packet processing components may also include functionality to receive requests for one or more network device agents and to provide responses to these requests. Additional detail about the interaction of the packet processing components and network device agents is provided below.

In one embodiment of the disclosure, the queue depth agent (202) includes functionality to generate a queue depth report when the number of packets in one or more egress queues in the packet processing components (208) exceeds a threshold. In one embodiment of the disclosure, the queue depth agent (202) includes functionality to enable a network administrator to specify queue depth thresholds (which may be specified as a number of packets in an egress queue) on one or more egress queues on network device and then to request that the packet processing components notify the queue depth agent when the number of packets in any egress queue exceeds the corresponding queue depth threshold. Alternatively, the queue depth agent (202) may periodically poll (or query) the packet processing components to determine whether any egress queue exceeds the corresponding queue depth threshold. When the queue depth agent determines that any egress queue exceeds the corresponding queue depth threshold, the queue depth agent may generate and send a queue depth report to the network monitoring system. The queue depth report may specify the identity of the egress queue, the identity of the network device in which the egress queue is located, and the current depth of the egress queue. Depending on the implementation of the queue depth agent, the queue depth agent may accumulate information about any egress queue that exceeds the corresponding queue depth threshold and then generate and send a corresponding queue depth report that includes information about a set of egress queues on the network device. Additionally, or alternatively, the queue depth agent may periodically send queue depth reports (e.g., every 1 s) to the network monitoring agent. In this scenario, if there are no egress queues that exceed the corresponding queue depth thresholds during a given time period (e.g., in the previous 1 s), then no queue depth report is sent for the given time period.

In one embodiment of the disclosure, the sampling agent (204) includes functionality to request the packet processing components (208) to sample received packets. The rate and manner (e.g., randomly sampled) in which packets are sampled may be specified by the sampling agent. Once configured, the packet processing components (208) gather flow information and provide this flow information to the sampling agent (204). In one embodiment of the information, the flow information corresponds to copies of sampled packets (i.e., a sampling of packets that are received by the network device). The flow information may also include information related to queue depths on ingress and egress queues (not shown) in the network device at the time the packet was sampled. In one embodiment of the disclosure, the flow information is collected in accordance with sFlow. The disclosure may be implemented using other sampling technology, e.g., Internet Protocol Flow Information Export, without departing from the disclosure.

In one embodiment of the disclosure, the sampling agent (202) includes functionality to obtain the flow information from the packet processing components (208), aggregate the flow information (as appropriate) and generate one or more flow datagrams based on the aggregated information. The sampling agent (202) may subsequently provide the flow datagrams to a network monitoring system. Aggregated information may include, but is not limited to, for example, aggregate statistics on traffic based on destination port, source IP, originating AS (Autonomous System) number of the source IP, distribution of the size of the packets, other summary statistics based on various flags/headers in the packets. The information and/or data that the sampling agent sends to the network monitoring agent may be collectively referred to as sampling data.

In one embodiment of the disclosure, the in-band network telemetry agent (206) includes functionality to configure one or more packet processing components to: (i) act as an INT source, (ii) act as an INT sink, and/or (iii) process a packet that has been tagged by an INT source.

When the packet processing components are configured to act as an INT source, the packet processing components include functionality to evaluate one or more portions of the header of each packet received by the network device to determine if the packet should be tagged. If the packet is to be tagged, then the packet is modified (e.g., a bit in a header of the packet is modified) to indicate that any network device that receives this packet should determine when the packet arrived at the network device and/or when the packet left the network device. The aforementioned information about when the packet was received by and/or transmitted from a network device may be specified using one or more timestamps. These timestamps may be referred to as INT data. When the packet processing components are configured to act as an INT source, the packet processing components also obtain INT data associated with the tagged packet and then append (or otherwise add) the INT data to the packet prior to the packet being sent to a nexthop in its path towards its destination.

When the packet processing components are configured to processing tagged packets but not act as an INT source or INT sink, the packet processing components include functionality to evaluate one or more portions of the header of each packet received by the network device to determine if the packet is tagged. If the packet is tagged, then the packet processing components also obtain INT data associated with the tagged packet and then append (or otherwise add) the INT data to the packet prior to the packet being sent to a nexthop in its path towards its destination.

When the packet processing components are configured to act as an INT sink, the packet processing components include functionality to evaluate one or more portions of the header of each packet received by the network device to determine if the packet is tagged. If the packet is tagged, then the packet processing components also obtain INT data associated with the tagged packet and then append (or otherwise add) the INT data to the packet. A copy of the packet with the INT data (including the INT data added by prior network devices) is provided to the INT agent, which then sends the copy of the packet (along with the INT data) to a network monitoring system. Once the copy of the packet with the INT data is sent to the network monitoring agent, the INT data of the packet that is still present in the network device may be removed from the packet prior to the packet being sent to a nexthop in its path towards its destination. The result of the processing by the INT sink is a copy of the packet with the corresponding INT data is sent to the network monitoring agent while the packet is transmitted towards its destination.

A network device in the network may operate as both an INT source and an INT sink for different sets of packets. The specific network devices that act as INT sources and/or INT sinks may vary based on the implementation of one or more embodiments of the disclosure.

Each network device in the network may include one, some, or all of the aforementioned network device agents. Further, if a network device includes a particular network device agent, the network device agent may not be actively used by the network device.

Each of the aforementioned network agents may be implemented in software, e.g., executable instructions (stored in a non-transitory computer readable medium (not shown)), which when executed by a processor(s) in the network device system, enable the network device (200) to perform all or a portion of the aforementioned functionality.

Alternatively, one or more of the network device agents may be implemented using a special purpose computing device, operatively connected to or housed within the network device, that includes one or more application-specific processor(s) (or hardware) configured to only execute embodiments of the disclosure. In such cases, one or more network device agents may be implemented using one or more circuits and may retain limited functionality to receive input and generate output in accordance with various embodiments of the disclosure.

Figure 1C:
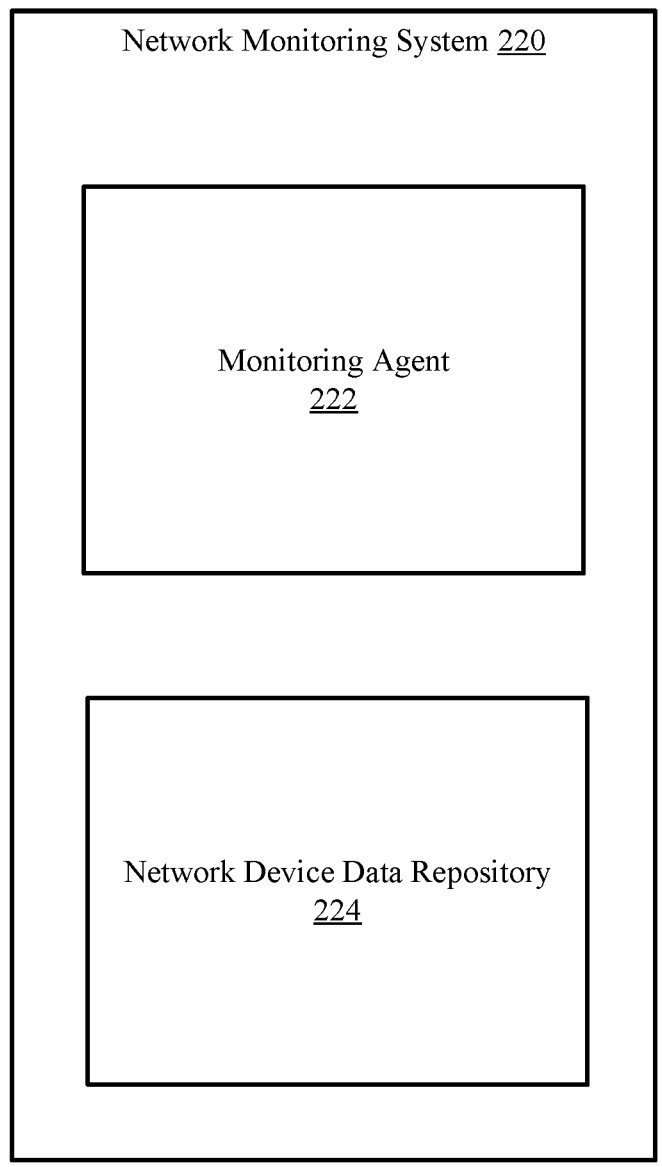
FIG. 1C shows a network monitoring system in accordance with one or more embodiments of the disclosure.

FIG. 1C shows a network monitoring system in accordance with one or more embodiments of the disclosure. The network monitoring system (220) may include a monitoring agent (222) and a network device data repository (224). Each of these components is described below.

In one or more embodiments, the network device data repository (224) includes information and/or data that is received from the network device agents. The received information and/or data may be stored in the network device data repository (224) using any known or later developed data structure(s). Depending on the implementation, the network device data repository (224) may include volatile storage, persistent storage, or any combination thereof. While the network device data repository is shown as being part of the network monitoring system, the network device data repository may be external to the network monitoring system. In such embodiments, the network device data repository may be accessed by the network monitoring system using any combination of wired and/or wireless communication technology.

Figure 3:
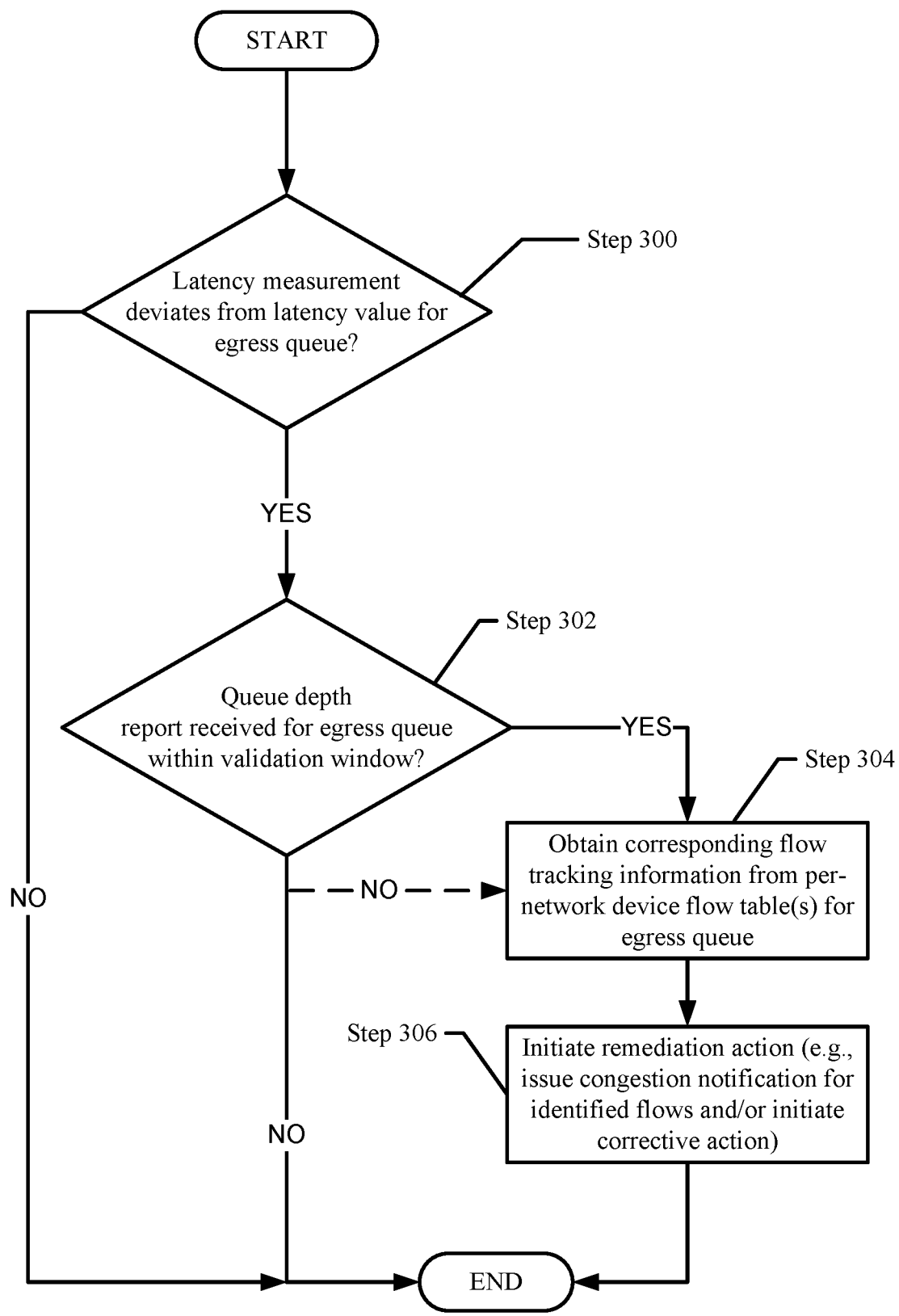
FIG. 3 shows a method for processing latency measurements by the network monitoring system in accordance with one or more embodiments of the disclosure.

In one or more embodiments, the monitoring agent (222) includes functionality to receive information and/or data from the network device agents, store the received information and/or data in the network device data repository (224) and perform the functionality described in FIGS. 2A-3.

One skilled in the art will recognize that the architecture of the system, a network monitoring system, a network device, and of the network is not limited to the components shown in FIGS. 1A-1C. Further, the network devices and the network monitoring system may include components not shown in FIGS. 1B and 1C, respectively.

FIG. 2A shows a method for obtaining and processing sampling data by the network monitoring system in accordance with one or more embodiments of the disclosure. The method of FIG. 2A may be performed by, for example, a network monitoring system (e.g., 102, FIG. 1A). Other components illustrated in FIGS. 1A-1C may perform the method of FIG. 2A without departing from embodiments of the disclosure. Further, one or more steps in FIG. 2A may be performed concurrently with one or more steps in FIGS. 2A-3.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, sampling data is received from the sampling agent on a network device. The received sampling data may then be stored in the network device data repository.

In Step 202, the received sampling data is processed to determine which flows are passing through which egress queues on the network device. More specifically, the sampling data is analyzed to identify a flow with which the packet is associated. In one embodiment of the disclosure, a flow is a set of IP packets passing an observation point in the network during a certain time interval. All packets belonging to a particular flow have a set of common properties. Each property is defined as the result of applying a function to the values of: (i) one or more packet header field(s) (e.g., destination IP address), transport header field (e.g., destination port number), or application header field (e.g., RTP header fields); (ii) one or more characteristics of the packet itself (e.g., number of MPLS labels, etc.), and/or (iii) one or more of the fields derived from packet treatment (e.g., nexthop IP address, the output interface, etc.). A packet is defined to belong to a flow if it completely satisfies all of the defined properties of the flow.

Once the flow to which the packet belongs is identified, the egress queue in which the packet was at least temporarily stored is identified. The identity of the egress queue is determined from the received sampling data.

In Step 204, a per-network device flow table is updated based on the processing in Step 202. In one embodiment of the disclosure, the network device data repository may maintain, on a per-network device basis, a flow table which identifies the flows (or at least certain flows) that are being processed by each egress queue in the network device. For example, the flow table may specify the top N (e.g., ten) flows that each egress queue in a given network device is processing. A flow becomes a top N flow based on how many times packets with a given flow are identified in the received sampling data. The disclosure is not limited to the aforementioned example. Continuing with the discussion of Step 204, when information that a packet associated with a flow and an egress queue of a particular network device is received (e.g., as sampling data), the per-network device flow table is updated to reflect that a packet associated with the flow has passed through a specific egress queue. The update may correspond to incrementing a counter to reflect the processing of the packet. Once the counter is updated, the top N flows associated with the egress queue may be updated based on the updated counter value for the flow and the corresponding counter values of all other flows that have been processed by the egress queue. In this manner, the network monitoring system tracks in real-time (or near real-time) the top N flows that each egress queue in the network is processing. The aforementioned data about the flows that is maintained in the per-network device flow table is collectively referred to as flow tracking information.

The method shown in FIG. 2A may be performed continuously in order to obtain sampling data from network devices across the network. Further, while Step 204 references a per-network device flow table, the aforementioned information may be tracked using any other data structure and/or at any other level of granularity without departing from the disclosure.

FIG. 2B shows a method for obtaining and processing INT data by the network monitoring system in accordance with one or more embodiments of the disclosure. The method of FIG. 2B may be performed by, for example, a network monitoring system (e.g., 102, FIG. 1A). Other components illustrated in FIGS. 1A-1C may perform the method of FIG. 2B without departing from embodiments of the disclosure. Further, one or more steps in FIG. 2B may be performed concurrently with one or more steps in FIGS. 2A-3.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 210, INT data and a copy of the packet associated with the INT data is received from a network device (e.g., an INT sink). As discussed above, the INT data includes one or more timestamps related to when the packet ingressed and/or egressed from a given network device(s) as it traversed through the network.

In Step 212, the copy of the packet received in Step 210 is analyzed to determine the egress queues through which the packet passed. More specifically, as discussed above, when a packet is received by a network device, at least a portion of the packet header is analyzed in order to classify the packet (e.g., to add QoS information). Each egress queue in the network device is associated with QoS information. Thus, once a packet is associated with specific QoS information, the network device queues the packet in an egress queue that is associated with the matching QoS information. For example, if the result of analyzing the packet is a QoS tag A, then the packet is queued in an egress queue that is associated with QoS tag A. Continuing with the discussion of Step 212, the network monitoring agent maintains, e.g., in the network device data repository, a QoS to egress queue mapping, that specifies which QoS tags are associated with each egress queue in each network device in the network. Thus, once the QoS tag is determined from classification of the packet, the QoS to egress queue mapping is used to identify the egress queue that processed the packet.

Depending on the implementation of the INTT, the INT data may include timestamps gathered from more than one network device. In this scenario, Step 212 includes determining, on a per-network device basis, each egress queue that processed the packet (i.e., the packet associated with the INT data).

In Step 214, the latency value(s) associated with the egress queue(s) identified in Step 212 is updated. More specifically, for each network device through which the packet passed and for which there are corresponding timestamps in the received INT data, the network monitoring agent: (i) determines a latency measurement for egress queue on the network device using the appropriate timestamps in the INT data, and (ii) updates a latency value in a latency model using the latency measurement.

The latency measurement for a given egress queue in network device B may be calculated as follows: (i) timestamp when packet was transmitted from network device B—timestamp when packet was received by network device B; (ii) timestamp when packet was transmitted from network device B—timestamp when packet was transmitted from network device A to network device B; and/or (iii) timestamp when packet was received by network device C from network device B—timestamp when packet was received by network device B from network device A. Other methods for determining a latency measurement for an egress queue using INT data may be used without departing from the disclosure.

Continuing with the discussion of Step 214, as discussed above, the network monitoring agent generates and maintains a latency model for the network, where the latency model includes latency values for egress queues in the network. Because the latency model is generated and maintained using INT data, the rate at which the latency model is generated as well as the egress queues for which the latency model has corresponding latency values varies based on how INTT is implemented in a given network.

The latency value for a given egress queue may be calculated as follows: (i) the average of all latency measurements determined for the egress queue; (ii) a weighted average of all latency measurements determined for the egress queue, where the weighting favors more recently received latency measurements for the egress queue; and (iii) an exponentially weighted average of all latency measurements determined for the egress queue, where the weighting favors more recently received latency measurements for the egress queue. Other methods for determining a latency value for an egress queue may be used without departing from the disclosure.

The method shown in FIG. 2B may be performed continuously as INT data is obtained from network devices across the network and to generate and/or update a latency model for the network.

FIG. 3 shows a method for processing latency measurements by the network monitoring system in accordance with one or more embodiments of the disclosure. The method of FIG. 3 may be performed by, for example, a network monitoring system (e.g., 102, FIG. 1A). Other components illustrated in FIGS. 1A-1C may perform the method of FIG. 3 without departing from embodiments of the disclosure. Further, one or more steps in FIG. 3 may be performed concurrently with one or more steps in FIGS. 2A-3.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

The method shown in FIG. 3 may be performed each time the method shown in FIG. 2B is performed.

In Step 300, the latency measurement (e.g., calculated in Step 212) is compared to the corresponding latency value (e.g., calculated in Step 214) to determine whether the latency measurement deviates from the latency value. Step 300 provides an initial indication that there may be congestion in the egress queue (which may or may not be validated in Step 302). In one embodiment, the egress queue may be referred to as a congestion point. While the disclosure describes congestion as occurring at the egress queue, the disclosure is not limited to the egress queue being the only congestion point in the network; rather, embodiments of the disclosure may be extended to detecting and validating congestion at other locations (i.e., congestion points) in the network.

As discussed above, the latency value is an average (or moving average) of the latency measurements for the egress queue. Thus, the comparison in Step 300 is used to determine whether the latency measurement (i.e., the most recently calculated latency measurement) varies from the latency value. In one embodiment of the disclosure, the latency measurement is deemed to have deviated (or varied) from the latency value when the latency measurement exceeds the latency value. In one embodiment of the disclosure, the latency measurement is deemed to have deviated (or varied) from the latency value when the latency measurement exceeds the latency value by a certain fixed amount and/or certain percentage (e.g., by five percent). The invention is not limited to the aforementioned examples. If the latency measurement is deemed to have deviated (or varied) from the latency value then the process proceeds to Step 302; otherwise, the process ends.

In Step 302, a determination is made about whether a queue depth report that specifies the egress queue (i.e., the egress queue for which the determination was made in Step 300) was received during a validation window. Step 302 is used to validate (or provide at least some additional support for) the initial determination in Step 300 that the egress queue is congested.

Continuing with the discussion of Step 302, the validation window is a period of time that includes the time during which the timestamps (via INT data) were received and/or when latency measurements were determined by the network monitoring system. For example, if the latency measurement was determined at time T then the validation window may be, e.g.: (i) T±x seconds and/or (ii) T to T+y seconds. Other methods for specifying the validation window may be used without departing from the disclosure. Further, the validation window may be specified on a per-network basis, on a per-network device basis, or a per-egress queue basis and/or using another level of granularity.

If a queue depth report specifying the egress queue is/was received in the validation window, then the process proceeds to Step 304; otherwise, the process may end. In various embodiments of the disclosure, the process may still proceed to Step 304 even when a queue depth report specifying the egress queue was not received in the validation window.

In Step 304, the flow tracking information for the egress queue (i.e., the egress queue for which the determination was made in Step 300) is obtained, e.g., from the per-network flow table. The flow tracking information may specify the top N flows that are currently being processed by the egress queue.

In Step 306, remediation action is initiated. The remediation action may include generating and issuing a congestion notification to, e.g., a network administrator. The congestion notification may include, e.g., information that identifies the network device, and the egress queue (i.e., the egress queue for which the determination was made in Step 300), the flow tracking information obtained in Step 304 and an indication of whether the congestion determination was validated (i.e., a queue depth report specifying the egress queue is/was received in the validation window). In another embodiment, the remediation action includes initiating a corrective action to, e.g., the corrective action may include determining which flows are impacted by the congestion (i.e., the flows identified in Step 304) and then initiating the modification of one or more network devices in the network to modify that path that one or more of the packets associated with the flows taken through the network. In this manner, packets associated with one or more of the impacted flows may take a different path through the network, thereby potentially reducing future congestion on the egress queue (i.e., the egress queue for which the determination was made in Step 300). Other corrective actions may be performed without departing from the disclosure.

EXAMPLE

Figure 4:
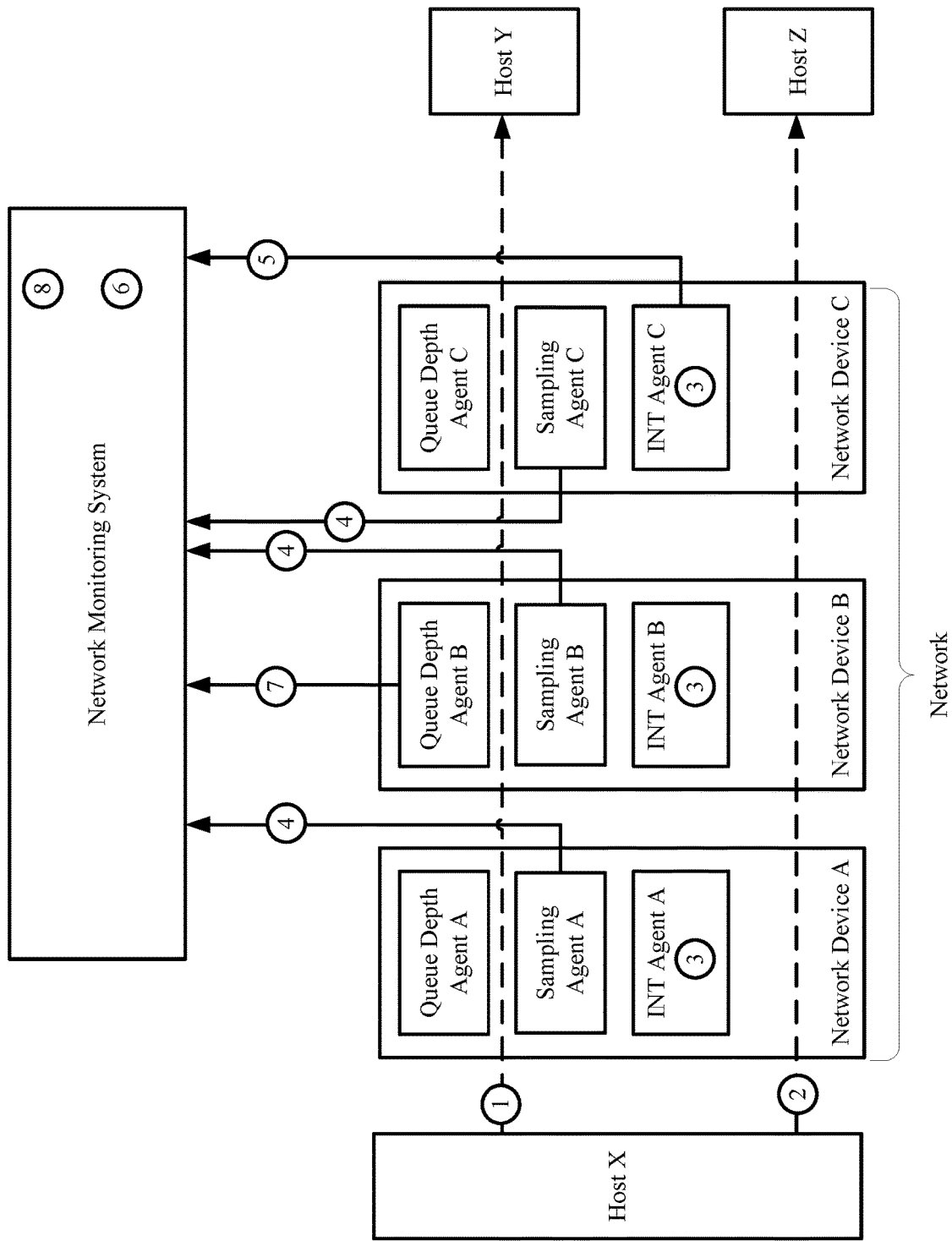
FIG. 4 shows an example in accordance with one or more embodiments of the disclosure.

FIG. 4 shows an example in accordance with one or more embodiments of the disclosure. The example is not intended to limit embodiments of the disclosure. The numbers in the brackets below, e.g., "[1]", correspond to the same circled numbers in FIG. 4

Consider a scenario in which Host X is sending packets associated with Flow 1 to Host Y [1] and is sending packets associated with Flow 2 to Host Z [2] via Network Devices A, B, and C in the Network. As some point in time, a network administrator configures: (i) Network Device A as an INT source to tag certain packets from Flow 1; (ii) Network Device C as an INT Sink, and (iii) all INT agents on the network devices (i.e., INT Agent A, INT Agent B, INT Agent C) to collect INT data for all tagged packets of Flow 1. [3]

As the packets from Flow 1 and Flow 2 traverse the network, the sampling agents (i.e., Sampling Agent A, Sampling Agent B, Sampling Agent C), on the network devices randomly sample certain packets from these flows (as well as other flows (not shown)) and send the corresponding sampling data (which includes a copy of the sampled packet) to the network monitoring agent [4].

At some later point in time, a tagged packet (i.e., a packet tagged by the INT source) is received by the INT Agent C. INT Agent C, which is configured as an INT sink, sends INT data and a copy of the tagged packet to the network monitoring system [5].

Upon receipt of the INT data and the copy of the tagged packet, the network monitoring system performs the method shown in FIG. 2B to determine one or more latency measurements from the INT data and to update the latency model maintained by the network monitoring agent. In addition, the network monitoring agent determines that the latency measurement for an egress queue (not shown) on network device B determined from the INT data exceeds a corresponding latency value in the updated latency model (which was just updated using the INT data) [6]. The network monitoring system then determines whether any queue depth reports have been received that specify the aforementioned egress queue. The network monitoring system determines that no such queue depth reports have been received; however, the validation window has not yet closed/expired and, as such, the network monitoring system waits for the validation window to expire.

In this example, prior to the validation window expiring, a queue depth report specifying the egress queue is received from queue depth agent B [7]. In response to receiving the queue depth report, the network monitoring system validates the congestion initially detected by the latency model and then issues a congestion notification that specifies the egress queue on network device B along with information about the top five flows that have been/are being processed by the egress queue.[8]

END OF EXAMPLE

Figure 5:
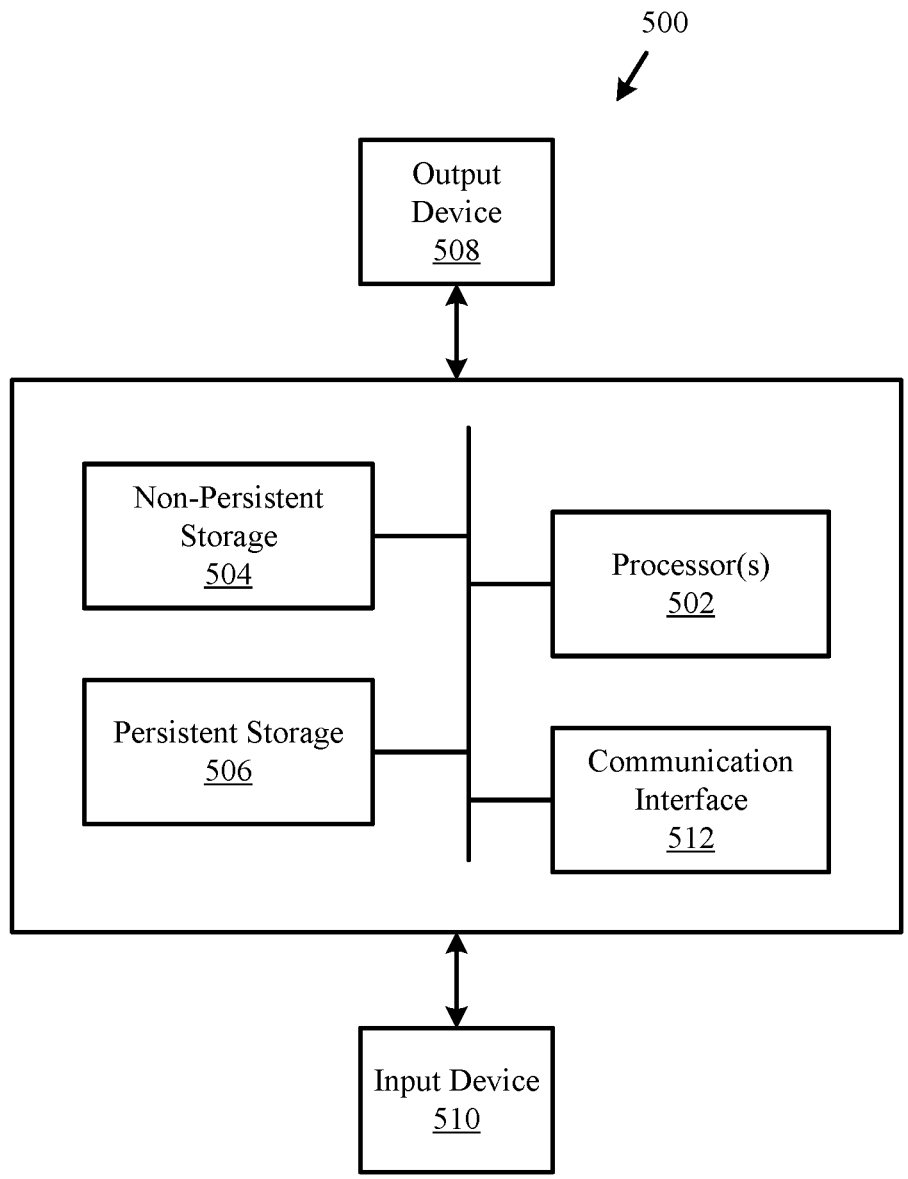
FIG. 5 shows a host in accordance with one or more embodiments of the disclosure.

As discussed above, embodiments of the disclosure may be implemented using computing devices. FIG. 5 shows a diagram of a computing device in accordance with one or more embodiments of the disclosure. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (410), output devices (508), and numerous other elements (not shown) and functionalities. Each of the components illustrated in FIG. 5 is described below.

In one embodiment of the disclosure, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network by a network monitoring system, wherein the network comprises a plurality of network devices, the method comprising:
    receiving, by the network monitoring system, in-band network telemetry (INT) data from a network device of the plurality of network devices;
    dynamically updating a latency model of the network using the INT data to obtain an updated latency model, the latency model comprising latency values for egress queues on the plurality of network devices, the latency values determined based on latency measurements for the egress queues determined from the INT data;
    identifying a congestion point associated with a network device in the network using the updated latency model and at least a portion of the INT data;
    validating the congestion point, wherein validating the congestion point comprises determining whether a queue depth report associated with the congestion point has been received within a validation window; and
    initiating a remediation action based on the validation.

2. The method of claim 1, wherein the congestion point is validated using queue depth monitoring at the network device associated with the congestion point.

3. The method of claim 1, wherein a latency value is an exponentially weighted moving average of latency measurements for at least one queue, wherein second INT data is used to derive a latency measurement of the latency measurements for the at least one queue, wherein the second INT data is received from the network device prior to the INT data.

4. The method of claim 1, wherein the congestion point is identified using the latency value in the latency model and the latency measurement derived from the INT data.

5. The method of claim 4, wherein the congestion point is identified when the latency measurement exceeds the latency value.

6. The method of claim 4, wherein the congestion point is identified when the latency measurement deviates from the latency value by more than a range.

7. The method of claim 4, wherein the congestion point is associated with an egress queue on one of the plurality of network devices.

8. The method of claim 1, wherein the validation window comprises a period of time that includes a time at which the congestion point was identified.

9. The method of claim 8, wherein the validation window comprises a second time that is later than the time at which the congestion point was identified, wherein the queue depth report associated with the congestion point was received at the second time.

10. The method of claim 1, wherein the remediation action comprises issuing a congestion notification.

11. The method of claim 10, further comprising:
    obtaining flow tracking information for at least one network device in the network,
    wherein the congestion notification specifies at least one flow,
    wherein the flow tracking information specifies the at least one flow.

12. The method of claim 1, wherein the remediation action comprises initiating a corrective action on the network.

13. The method of claim 12, wherein the corrective action comprises modifying an operation of at least one network device in the network.

14. A method for managing a network, the method comprising:
- receiving, by a network monitoring system, in-band network telemetry (INT) data from the network;
- identifying a congestion point associated with a network device in the network using a dynamically updated latency model and at least a portion of the INT data, the latency model comprising latency values for egress queues on the plurality of network devices, the latency values determined based on latency measurements for the egress queues determined from the INT data;
- validating the congestion point using a queue depth report;
- obtaining flow tracking information, wherein the flow information specifies the at least one flow associated with the congestion point; and
- issuing, in response to the identifying, a congestion notification specifying the at least one flow.

15. The method of claim 14, further comprising:
- making a determination that a queue depth report associated with the congestion point is not received during a validation window,
- wherein the determination does not prevent the congestion notification from being issued, and
- wherein the congestion notification specifies that the congestion point was not validated.

16. The method of claim 14, wherein the congestion point is an egress queue in the network.

17. The method of claim 14, wherein the congestion point is identified when the latency measurement deviates from the latency value.

18. A network monitoring system operatively connected to a plurality of network devices in a network, comprising:
- a processor,
- memory comprising instructions, which when executed by the processor, perform a method, the method comprising:
- receiving in-band network telemetry (INT) data from the network;
- identifying a congestion point associated with a network device in the network using a dynamically updated latency model and at least a portion of the INT data, the latency model comprising latency values for egress queues on the plurality of network devices, the latency values determined based on latency measurements for the egress queues determined from the INT data;
- validating the congestion point using a queue depth report obtained from the network;
- obtaining flow tracking information for at least one network device in the network the flow tracking information specifying at least on flow associated with the congestion point; and
- initiating a remediation action based on the validation, wherein the remediation action comprises issuing a congestion notification specifying the at least one flow.

* * * * *